United States Patent
Asao

(10) Patent No.: US 11,602,918 B2
(45) Date of Patent: Mar. 14, 2023

(54) GIMMICK EXPRESSION MEDIUM PRODUCING METHOD AND DATA PROCESSING METHOD FOR GIMMICK EXPRESSION MEDIUM

(71) Applicant: SO-KEN Corporation, Osaka (JP)

(72) Inventor: Kouji Asao, Minoo (JP)

(73) Assignee: SO-KEN CORPORATION, Minoo (JP)

( * ) Notice: Subject to any disclaimer, the term of this patent is extended or adjusted under 35 U.S.C. 154(b) by 147 days.

(21) Appl. No.: 17/042,029

(22) PCT Filed: Dec. 28, 2018

(86) PCT No.: PCT/JP2018/048572
§ 371 (c)(1),
(2) Date: Sep. 25, 2020

(87) PCT Pub. No.: WO2019/187461
PCT Pub. Date: Oct. 3, 2019

(65) Prior Publication Data
US 2021/0237398 A1    Aug. 5, 2021

(30) Foreign Application Priority Data

Mar. 30, 2018 (JP) .............................. JP2018-067883
Jul. 4, 2018 (JP) ..................... PCT/JP2018/025318

(51) Int. Cl.
*B32B 7/023* (2019.01)
*B29D 11/00* (2006.01)
(Continued)

(52) U.S. Cl.
CPC ........ *B32B 7/023* (2019.01); *B29D 11/00605* (2013.01); *B41M 3/005* (2013.01);
(Continued)

(58) Field of Classification Search
CPC ... B29D 11/0605; B41M 3/005; B41M 3/008; B41M 2205/42; G09F 13/26; G02B 5/136
See application file for complete search history.

(56) References Cited

U.S. PATENT DOCUMENTS

2015/0317923 A1    11/2015    Edmonds

FOREIGN PATENT DOCUMENTS

JP    2004021129    *  6/2002
JP    2015-225438 A    12/2015
(Continued)

OTHER PUBLICATIONS

International Search Report for International Application No. PCT/JP2018/025318 dated Sep. 11, 2018 (2 sheets).
(Continued)

*Primary Examiner* — Matthew G Marini
*Assistant Examiner* — Marissa Ferguson-Samreth
(74) *Attorney, Agent, or Firm* — Kratz, Quintos & Hanson, LLP

(57) ABSTRACT

A gimmick expression medium producing method forms a gimmick expression medium 300. The gimmick expression medium 300 includes a retroreflective medium 1. A printing medium 301 placed on the retroreflective medium 1 includes a light-transmission layer 302. A gimmick print 303 which varies color of reflective light of the retroreflective medium 1 to produce a gimmick effect is printed on the light-transmission layer 302. The printing medium 301 is provided with a light-blocking layer 304 which partially blocks reflective light reflected by the retroreflective medium 1. The light-blocking layer 304 is composed of a white printing layer, and a reflection picture print 305 is printed on the light-blocking layer 304. The reflection pattern printing 305 and the gimmick print 303 are placed in adjacent to each other using a stripe-shaped (or dot-shaped) lattice pattern (Continued)

306, printing which can be seen on a printed matter under normal illumination and printing which can be seen under light source such as flash light can be printed at one time (one-pass) by the same printer.

11 Claims, 14 Drawing Sheets

(51) Int. Cl.
    *G02B 5/136*     (2006.01)
    *B41M 3/00*     (2006.01)
    *G09F 13/26*     (2006.01)

(52) U.S. Cl.
    CPC .............. *B41M 3/008* (2013.01); *G02B 5/136* (2013.01); *B32B 2307/416* (2013.01); *B41M 2205/42* (2013.01); *G09F 13/26* (2013.01)

(56) References Cited

FOREIGN PATENT DOCUMENTS

| | | | |
|---|---|---|---|
| JP | 2016-001208 A | | 1/2016 |
| JP | 2017-16031 A | | 1/2017 |
| JP | 2017-111334 | * | 6/2017 |
| JP | 2017-111334 A | | 6/2017 |
| JP | 2017-128047 | * | 7/2017 |
| JP | 2017-128047 A | | 7/2017 |
| JP | 2017-211594 A | | 11/2017 |
| KR | 102145156 | * | 6/2013 |
| WO | 02/076759 | * | 10/2002 |

OTHER PUBLICATIONS

International Search Report for International Application No. PCT/JP2018/048572 dated Mar. 12, 2019 (2 sheets).

* cited by examiner

[Fig. 1]
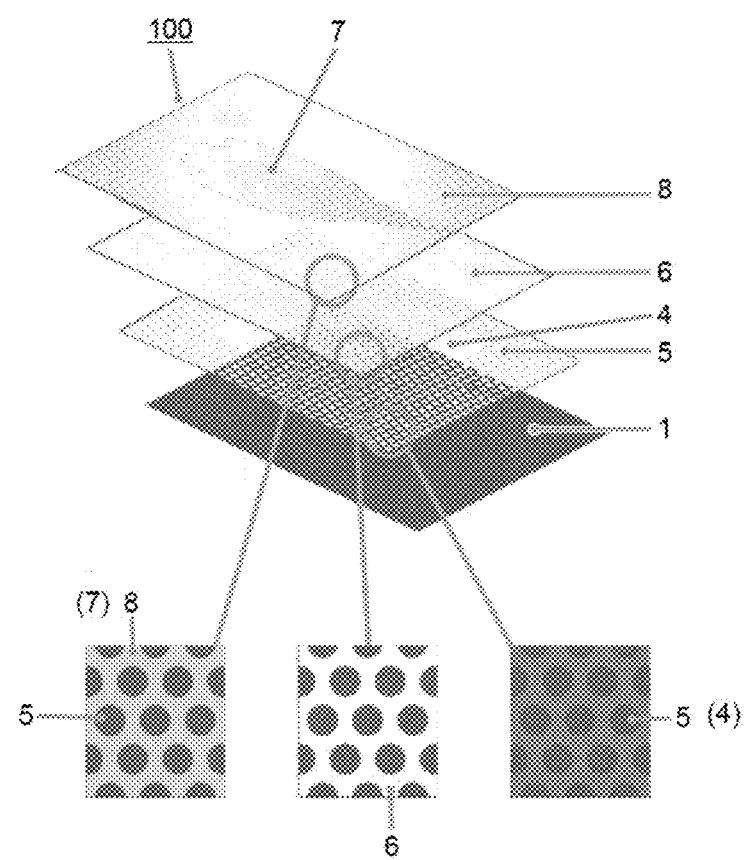

[Fig. 2]
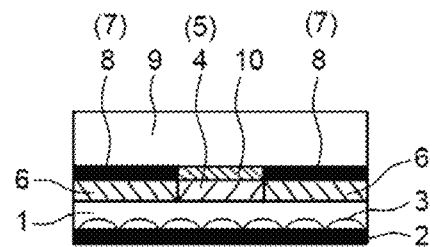

[Figs. 3]
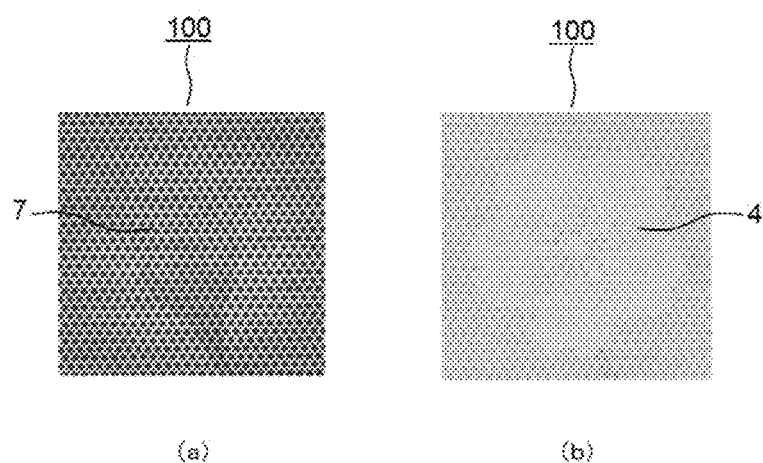

[Fig. 4]
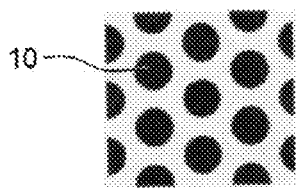

[Figs. 5]
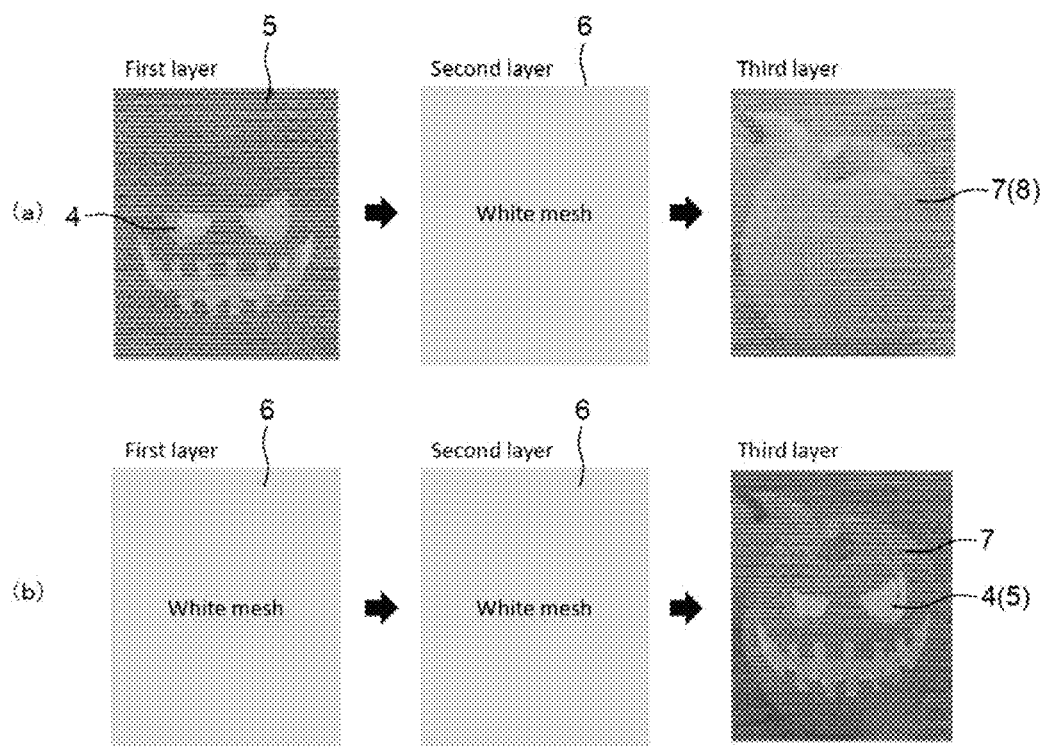

[Fig. 6]
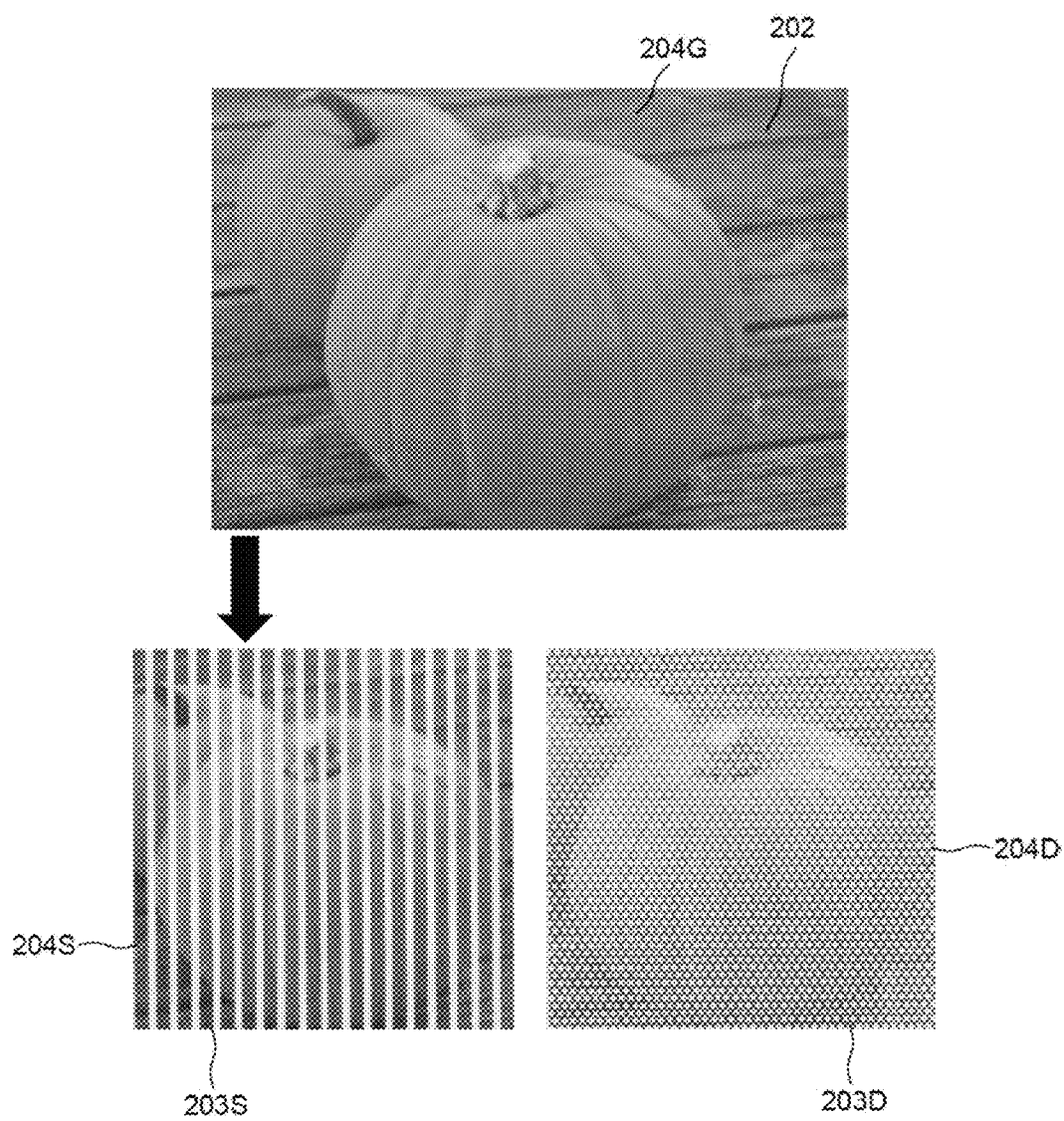

[Fig. 7]
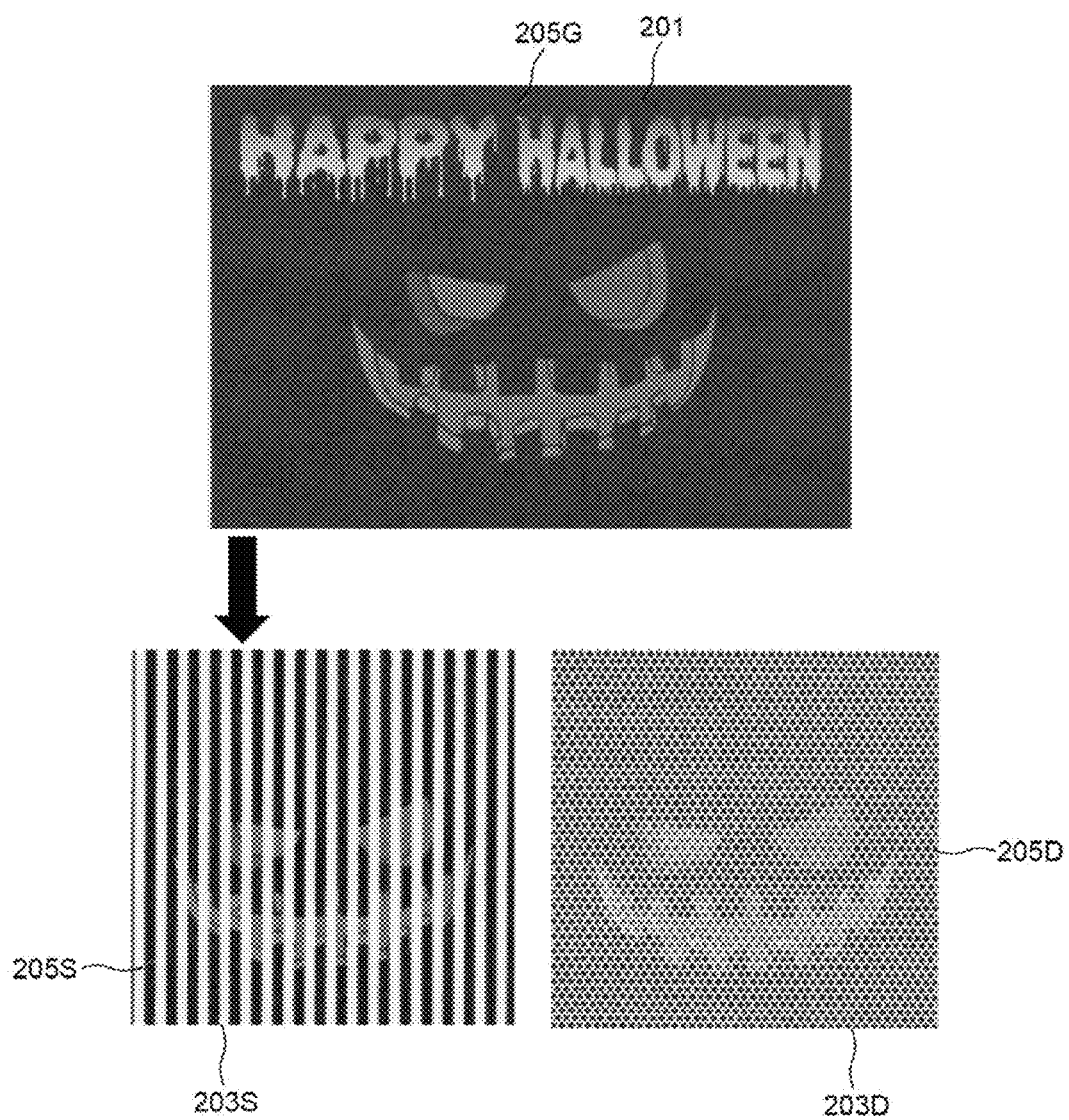

[Fig. 8]
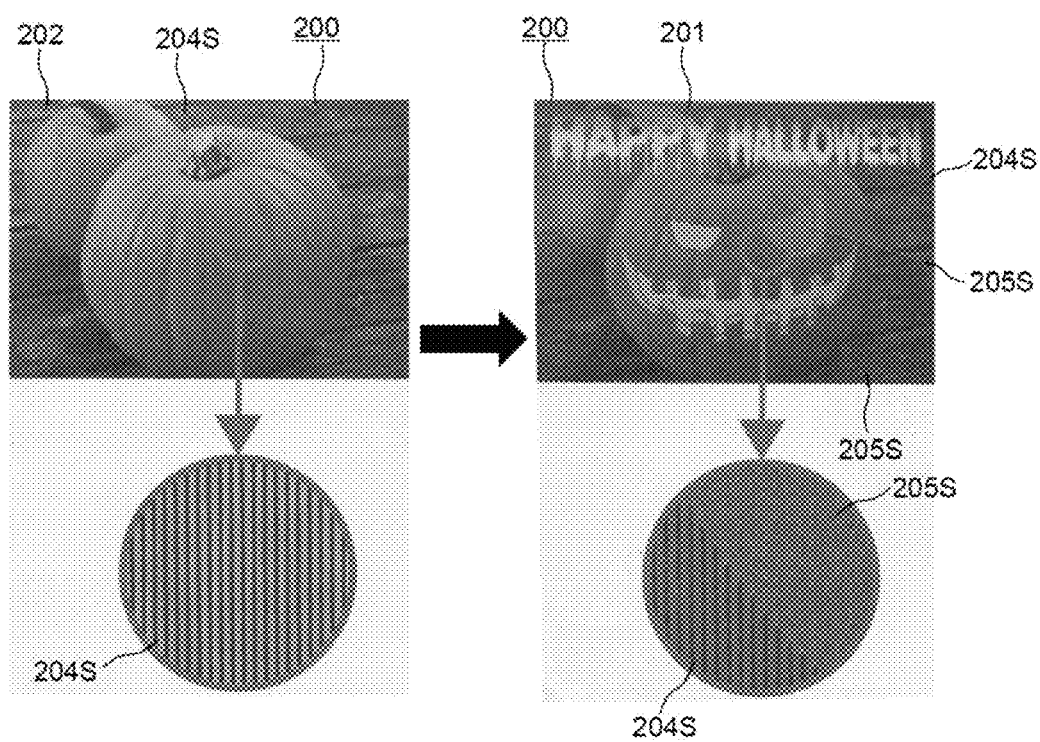

[Fig. 9]
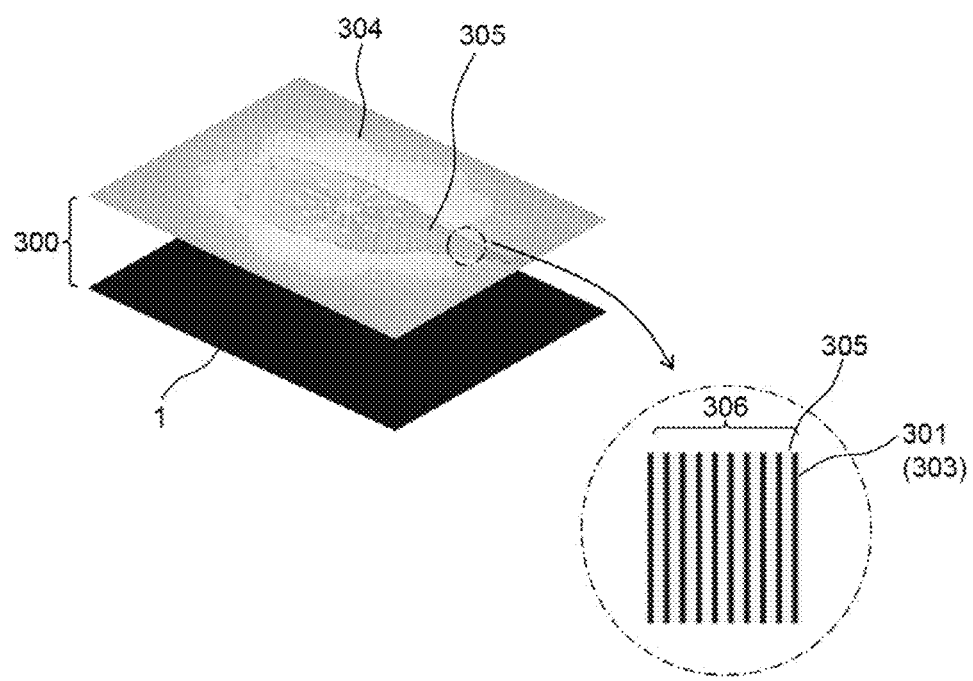

[Fig. 10]
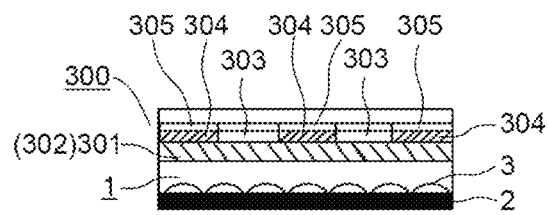

[Fig. 11]
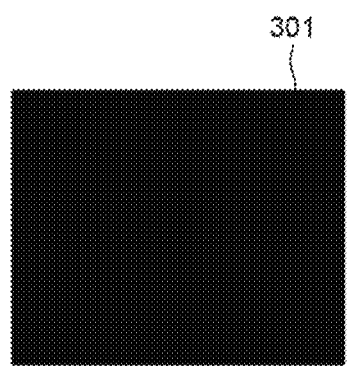
(a)
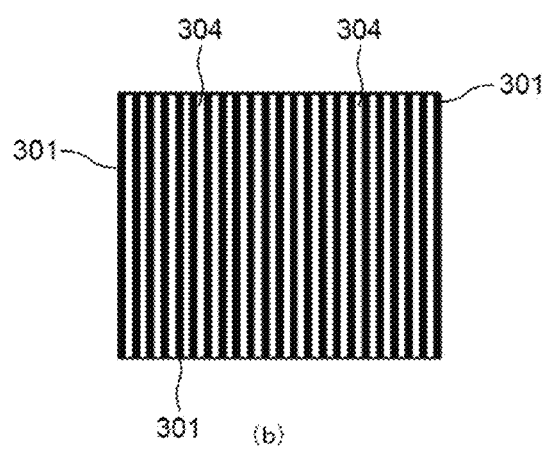
(b)
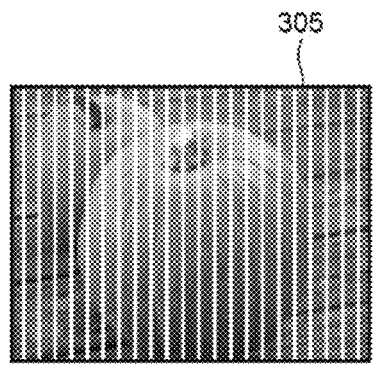
(c)
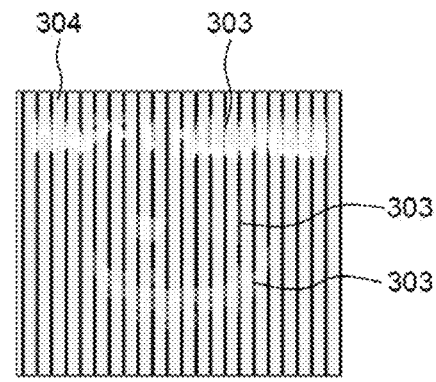
(d)

[Fig. 12]
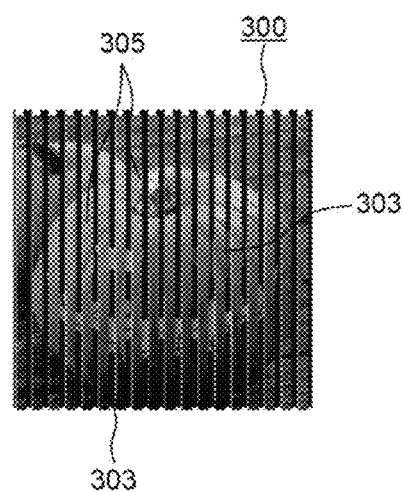

[Fig. 13]
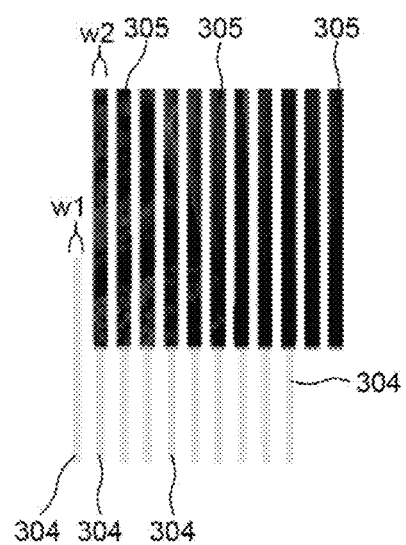

[Fig. 14]
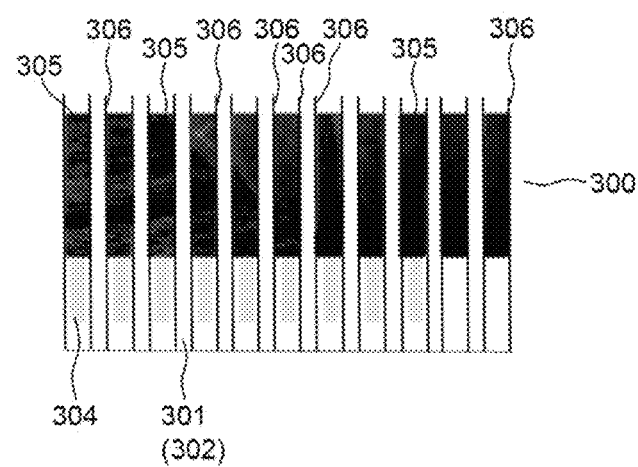

GIMMICK EXPRESSION MEDIUM PRODUCING METHOD AND DATA PROCESSING METHOD FOR GIMMICK EXPRESSION MEDIUM

TECHNICAL FIELD

The present invention relates to a gimmick expression medium producing method and a data processing method for the gimmick expression medium in which a constant reflection picture or character is shown in a normal situation (normal solar light or the like), and if light is shed thereon, a pattern which is different from normal reflection picture or character is emerged (when taking flash photograph using smartphone or the like) and gimmick expression can be made.

BACKGROUND TECHNIQUE

As the above-described gimmick expression medium, there exists a medium utilizing a retroreflective element for example, and the gimmick expression medium is commonly used for a road sign, a license plate, safety sign such as a life preserver, and the like. In such a sign, a pattern of a retroreflective element formed from a prism or a glass bead is used. Since they express information which shows the retroreflective element by means of characters or numbers, it is necessary to cut them into predetermined physical shape, and it is impossible express a free design or to change the design (see patent document 1).

On the other hand, in a printed matter or display, fun or change of expression is required. When a flash photograph is taken by means of a smartphone or the like using a technique called gimmick, there is a need of a medium capable of emerging a pattern which is different from a normal reflection picture or character, and effectively carrying out a dramatic impact and presentation. For this purpose, there exists a technique in which a print which can be seen under normal illumination and a print which can be seen under light source such as flash light are overlapped and printed on a printed matter (see patent document 2).

PRIOR ART DOCUMENTS

Patent Documents

[Patent Document 1] Japanese Patent Application Laid-open No. 2017-211594
[Patent Document 2] Japanese Patent Application Laid-open No. 2015-225438

SUMMARY OF THE INVENTION

Problem to be Solved by the Invention

However, in the medium in which a print which can be seen under normal illumination and a print which can be seen under light source such as flash light are overlapped and printed on a printed matter, since two expression prints overlap each other, the print which is seen under normal illumination hides expression which is for flash light, or expression for gimmick is seen also under the normal illumination, so-called spoiler is caused, change is poor, and sufficient gimmick effect cannot be obtained. Further, since the print which can be seen under the normal illumination and the print which can be seen under the light source such as flash light are overlapped and printed on a printed matter, they cannot be printed by one-time printing operation at a time (one-pass).

It is an object of the present invention to provide a gimmick expression medium producing method and a data processing method for the gimmick expression medium capable of printing a print which is seen under normal illumination and a print which is seen under a light source such as flash light at a time (one-pass) by the same printer.

Means for Solving the Problem

To solve the above-described problem, the present invention provides a gimmick expression medium producing method for forming a printing layer which produces a gimmick effect for a printing medium using the printing medium having a light-transmission layer, the method including: a light-blocking layer forming step of partially covering the light-transmission layer of the printing medium to form a light-blocking layer for blocking light on the printing medium; a reflection picture print step of forming a reflection picture on the light-blocking layer; and a gimmick print step of forming a gimmick print layer to vary color of light which passes though the light-transmission layer to produce the gimmick effect, wherein in the light-blocking layer forming step, the light-blocking layer is placed on the printing medium to cover the light-transmission layer of the printing medium using a stripe-shaped or dot-shaped lattice pattern, the reflection picture and the gimmick print layer are placed in adjacent to each other by the stripe-shaped or dot-shaped lattice pattern, and the reflection picture print step of forming the reflection picture and the gimmick print step are carried out by one step (one-pass) using common image data using a same printer.

Further, the light-transmission layer of the printing medium may be a layer which black-reflects under reflection light. The gimmick expression medium producing method may further include a step of forming, between the reflection picture and the gimmick print layer, a spoiler-preventing zone which black-reflects under reflection light. The light which passes though the light-transmission layer may be obtained by any one of ultraviolet light-emitting body, phosphorescence body, solvatochromic fluorescent dye, stress luminous body, retroreflective medium and natural solar light.

Further, to solve the above-described problem, the present invention also provides a gimmick expression medium producing method for printing a printing layer which produces a gimmick effect for a printing medium, the method including: a gimmick print step of forming, on the printing medium using luminous ink, a gimmick print layer which produces the gimmick effect; a light-blocking layer forming step of forming, on the printing medium, a light-blocking layer which partially covers the printing medium; and a reflection picture print step of forming a reflection picture on the light-blocking layer, wherein in the light-blocking layer forming step, the light-blocking layer is placed on the printing medium to cover a portion of the printing medium using a stripe-shaped or dot-shaped lattice pattern, the reflection picture and the gimmick print layer are placed in adjacent to each other by the stripe-shaped or dot-shaped lattice pattern, and the reflection picture print step of forming the reflection picture and the gimmick print step are carried out by one step (one-pass) using common image data using the same printer.

Further, in the gimmick expression medium producing method of the invention, the light-transmission layer of the printing medium may black-reflect under reflection light. The gimmick expression medium producing method may further include a step of forming, between the reflection picture and the gimmick print layer, a spoiler-preventing zone which black-reflects under reflection light. The luminous ink may include any one of ultraviolet light-emitting body, phosphorescence body, solvatochromic fluorescent dye and stress luminous body.

Further, to solve the above-described problem, the present invention also provides a data processing method for printing a gimmick expression medium to print a printing layer which produces a gimmick effect for a printing medium, wherein when print data for reflection picture print to form a reflection picture on a light-blocking layer which partially covers the printing medium, and gimmick print data for gimmick print to produce the gimmick effect are formed, the print data for the reflection picture print and the gimmick print data for the gimmick print are combined in adjacent to each other into one common image data using a stripe-shaped or dot-shaped lattice pattern to form print data, and the reflection picture print and the gimmick print are carried out by one step (one-pass) using a same printer.

In the data processing method for the gimmick expression medium of the invention, wherein print data may be formed, and in the print data, a spoiler-preventing zone which black-reflects under reflection light may be provided between the reflection picture and the gimmick print. A gimmick print step and a reflection picture print step may be print data for q same ink-jet printing step.

According to a basic configuration of the gimmick expression medium which can be obtained by the producing method of the present invention, as expression for an observer, a reflection picture print which is seen under the normal illumination is shown to a gimmick medium (printed matter) and next, expression which is different from the reflection picture print is emerged by previously prepared printed gimmick print for performing expression by light which is directly emitted to eyes of the observer, thereby performing the gimmick expression. According to the gimmick print for gimmick expression, if light is shed (when taking flash photograph using a smartphone or the like), a retroreflective element provided on a rearmost portion of a medium reflects irradiated light, this light emerges expression of various colors by gimmick print, and expression which is different from reflection picture print that is seen under normal illumination is emerged.

The gimmick print for gimmick expression is expression made by light which is directly emitted to eyes of the observer. Therefore, in addition to the configuration in which light emitted by a retroreflective element is reflected, it is also possible to utilize illuminated signboard.

In the case of the illuminated signboard, backlight (electric spectaculars) is provided instead of retroreflective medium, and the backlight is directly emitted to eyes of the observer. The backlight (electric spectaculars) is flashed or intensity of light is changed, design or the like of light of the illuminated signboard is colored by gimmick print to perform the gimmick expression. If solar light is utilized using a light-dark difference between outside a room and inside the room, the solar light is colored by gimmick print (design or the like) when the solar light is seen from inside of the room, and gimmick expression can be performed.

In the present invention, observations are made from one side. However, if a light-dark difference between outside and inside of a room is used, since observations can be made from both surfaces (both surface on the outside and inside of the room), reflection picture print can be performed on a surface which is opposed to a light-blocking layer on a back side of a (white) light-transmission layer 302 such that the (white) light-blocking layer in the invention can be seen from both the surfaces. That is, if reflection picture print is carried out from a surface from which a back side of the surface (light-blocking layer) opposed to the light-blocking layer on the back side of the light-transmission layer 302 can be seen (such that the back side can be seen also from a lower side in the case of FIG. 10 for example) in addition to the reflection picture print of an upper surface (upper side in FIG. 10) as shown in an embodiment, variety of design (variety of reflection light) is increased from both surfaces on the outside and inside of the room, and gimmick can further be enjoyed.

Further, in gimmick medium (printed matter), it is possible to also utilize a configuration of gimmick print which uses light caused by luminous ink printed on a printing medium such that it reacts with light when flash photograph is taken by a smartphone or the like. A print which can be seen under normal illumination on a printed matter is a reflection picture print in which a light-blocking layer for blocking light directly emitted to eyes of an observer is provided to hide a gimmick print, and a reflection picture is formed on the light-blocking layer as a reflection picture print. Print data for printing a reflection picture and gimmick print data for the gimmick print are placed in adjacent to each other using a stripe-shaped or dot-shaped lattice pattern. The light-blocking layer also uses a stripe-shaped or dot-shaped lattice pattern. The print data for reflection picture print and the gimmick print data for the gimmick print are placed in adjacent to each other using the stripe-shaped or dot-shaped lattice pattern. According to this, print data is formed in combination with one common (one) image data, and it is possible to carry out the reflection picture print and the gimmick print with one step (one-pass) using the same printer.

Effect of the Invention

According to the above-described the gimmick expression medium producing method or the data processing method for printing the gimmick expression medium, the print data for printing the reflection picture and the gimmick print data for printing the gimmick are placed such that they do not basically overlap each other. Therefore, a higher gimmick effect can be obtained. When two prints, i.e., a reflection picture print which is essential as foundation of the gimmick effect and a gimmick print which is produced using light when necessary for the gimmick effect are carried out, the two prints can be carried out by one-pass. According to this, the two prints do not overlap each other or they are not deviated from each other which may be caused by deviation made by a printer and a printing medium as compared with two-times prints, design having higher freedom can be printed neatly, and the gimmick effect is enhanced.

Further, as expression made by light which is directly emitted to eyes of an observer, according to the gimmick print for producing the gimmick effect by coloring light which passes from a light-transmission layer of a printing medium or light caused by luminous ink printed on a printing medium, black background is used or a layer which is black-reflected under reflection light using a transparent medium (transparent plastic sheet) which is colored black (including color close to black but the color is not limited to black) is used. According to this, the gimmick print does not outstand easily under reflected light and spoiler can be prevented. If a spoiler-preventing zone which is black-reflected under reflected light is formed between the reflection picture and the gimmick print layer, it is possible to further prevent spoiler.

As the expression (gimmick print) made by light which is directly emitted to eyes of an observer, it is possible to use luminous ink which emerges ultraviolet light-emitting body, phosphorescence body, solvatochromic fluorescent dye, stress luminous body, retroreflective medium or the like is used, or natural solar light or the like from a back surface.

To exhibit the gimmick effect, in the gimmick print, a black background is used or a transparent medium (transparent plastic sheet) which is colored in black (including color close to black but the color is not limited to black) is used, a layer which black-reflects under reflection light is used, and a spoiler-preventing zone which black-reflects under reflection light is formed between a reflection picture and a gimmick print layer. According to this, it is possible to further prevent spoiler. However, the reflection picture print which is seen under the normal illumination is seen dark by an optical illusion in some cases. Therefore, if reflection picture print which is seen under the normal illumination is corrected brighter than an original design, an effect is enhanced in some cases.

BRIEF DESCRIPTION OF THE DRAWINGS

FIG. 1 is a diagram showing layers of a gimmick expression medium according to an embodiment of the present invention shown in a breaking down manner based on functions;

FIG. 2 is a partially enlarged sectional view of the gimmick expression medium of the embodiment;

FIG. 3(a) is a plan view of a medium showing a usual (normal) showing manner (expression) in the embodiment, and FIG. 3(b) is a plan view of a medium showing a showing manner (expression) at the time of flash photographing in the embodiment;

FIG. 4 is a partial enlarged plan view showing a gimmick camouflage layer in black ink which is ink-jet printed on a gimmick print layer in the embodiment;

FIG. 5(a) is a step explanatory diagram in the embodiment, and FIG. 5(b) is a step explanatory diagram of another embodiment of the invention;

FIG. 6 is an explanatory diagram for explaining a manner for forming an original picture of a reflection color pattern made by reflection color of a reflection picture print layer which explains a usual (normal) showing manner in a gimmick expression medium according to another embodiment of the invention and for explaining a manner for forming a reflection color pattern having a stripe-shaped or dot-shaped lattice pattern from the original picture;

FIG. 7 is an explanatory diagram for explaining a manner for forming an original picture of a light color pattern of a functional medium which is expressed at the time of flash photographing in the embodiment and for explaining a manner for forming a stripe-shaped or dot-shaped lattice pattern from the original picture;

FIG. 8 is an explanatory diagram for explaining expression of a usual (normal) showing manner of a gimmick expression medium according to the embodiment and for explaining a gimmick which realizes different expression at the time of flash photographing;

FIG. 9 is an exploded view of a gimmick expression medium according to another embodiment of the invention;

FIG. 10 is a partially enlarged sectional view of the gimmick expression medium of the embodiment;

FIGS. 11(a) to (d) are plan explanatory diagrams of the gimmick expression medium in producing steps of the embodiment;

FIG. 12 is a plan view of a gimmick expression medium after the steps in the embodiment;

FIG. 13 is a partially enlarged explanatory diagram for explaining a relation when a light-blocking layer and a reflection picture print 3 in the embodiment are formed (printed); and FIG. 14 is a partially enlarged plan view of a gimmick expression medium in another embodiment.

MODE FOR CARRYING OUT THE INVENTION

Concrete Content for Carrying Out the Present Invention (Part 1)

FIG. 1 is a diagram showing layers of a gimmick expression medium according to a first embodiment of the present invention shown in a breaking down manner based on functions, FIG. 2 is a partially enlarged sectional view of the gimmick expression medium in the embodiment, FIG. 3(a) is a plan view of a medium showing a usual (normal) showing manner (expression) in the embodiment, FIG. 3(b) is a plan view of a medium showing a showing manner (expression) at the time of flash photographing in the embodiment, and FIG. 4 is a partial enlarged plan view showing a gimmick camouflage layer in black ink which is ink-jet printed on a gimmick light-transmission layer in the embodiment.

The gimmick expression medium as the embodiment of the present invention and a producing method thereof will be described below using the drawings.

A gimmick expression medium 100 as the embodiment includes a black reflection layer 2 on a back surface thereof, and is composed of layers formed on the retroreflective medium 1 which includes a retroreflective element 3 therein. The layers are a light transmitting gimmick print layer 5 having a predetermined pattern 4 placed on the retroreflective medium 1 to vary color of reflective light of the retroreflective medium 1 to produce a gimmick effect, a light-blocking layer 6 for partially blocking reflective light of the retroreflective medium 1, and a frontmost reflection picture print layer 8 which is printed on the light-blocking layer 6 for showing a reflection picture 7 (including character or pattern) at the normal time.

These layers are printed into a mesh-shape using a circular dot pattern having a diameter of about 1 to 1.2 mm by an ink-jet printer (not shown). The gimmick expression medium 100 is appropriately provided with a protection layer 9 made of plastic to protect ink-jet printing layers on a frontmost surface. A gimmick camouflage layer 10 having a predetermined thickness is formed in black ink on the gimmick print layer 5. The gimmick camouflage layer 10 prevents the pattern 4 of the gimmick print layer 5 from being seen at the normal time. When the gimmick camouflage layer 10 is provided on the gimmick print layer 5, a printing thickness is appropriately selected using black ink or the like. It is possible to prevent the pattern of the gimmick print layer 5 from being seen easily at the normal time, but light quantity (luminance) of the gimmick light-transmission layer for a viewer is reduced. Therefore, it is necessary to previously correct to increase luminance of color and print the gimmick print layer 5. With this, it is possible to relatively solve the problem. It is also important to appropriately select (cut and try) a printing thickness of the gimmick camouflage layer 10 using black ink or the like.

The retroreflective medium 1 utilizes known retroreflection, and has the retroreflective element 3 formed from prism or glass bead (reflection light is basically required on a back surface thereof). For this reason, the retroreflective medium 1 has relatively high light reflection coefficient, and is often used on a road sigh, license plate and the like. The known retroreflective medium includes a white reflection light on a back surface thereof. If color of the back surface is set to white, since light quantity is increased and brightness is also increased, the retroreflective medium becomes a standard medium in this business field. However, to perform the gimmick expression, attention should be paid to the fact that the gimmick expression medium 100 of the embodiment of the present invention includes the black reflection layer 2 on the back surface thereof in principle and a better gimmick effect is obtained. The black reflection layer 2 on the back surface may be configured by printing, and adhesive or the like for fixing the retroreflective element 3 which is formed from prism or glass bead may be provided with a black adhesive layer. In addition to the above-described example for the retroreflective medium 1, reflective material of micro prism principle may be used, and if the retroreflective medium 1 has black base in a visible state, the same thing can be reproduced. The material is not limited to the sheet, and it is possible to form the foundation using silk screen ink. In short, if the gimmick expression medium has the black reflection light, reflective light from the reflection layer which is the retroreflective medium 1 is expressed more dramatically when light is shed on flash shooting. If the back surface is made while, a pattern can be seen at the normal time, spoiler (pattern of gimmick light-transmission layer 5 which should be seen only when light is shed on flash shooting or the like is faintly seen) appears, and the gimmick effect is deteriorated. If the retroreflective medium is configured using special beads in which reflection light (aluminum vapor deposition) is added to the outside of reflection glass bead, since the beads themselves reflect light even if the reflection layer is not provided on the back surface, reflection effect can be obtained. The retroreflective medium may be configured using the silk screen ink including such special beads.

A producing step of the gimmick expression medium 100 composed of the layers formed on the retroreflective medium 1 will be described below. First, the above-described retroreflective medium 1 is prepared. The light transmitting gimmick print layer 5 having the predetermined pattern 4 (this is cherry blossom in FIG. 3(b), and background is of one color, i.e., black or pink) for varying color of reflective light and producing the gimmick effect is formed in the mesh-shape on the retroreflective medium 1 on portions other than the light-blocking layer 6 and the reflection picture print layer 8 by ink-jet printing such that the light transmitting gimmick print layer 5 does not overlap with the light-blocking layer 6 (printing step of gimmick light-transmission layer). In the printing steps of the gimmick light-transmission layer, to obtain the gimmick effect, the picture colored pattern 4 is formed on the retroreflective medium 1 by the ink-jet printer using translucent ink as described above such that color of the reflective light is varied. As a result, light is input to the retroreflective medium 1 and retroreflected, and the predetermined pattern 4 of colored (blue, red and yellow) light is expressed (when light such as flash is shed on retroreflective medium 1).

Next, the light-blocking layer 6 which partially blocks reflective light of the retroreflective medium 1 is formed into the mesh-shape by ink-jet printing such that the light-blocking layer 6 does not cover (does not overlap) the light transmitting gimmick print layer 5 (printing step of light-blocking layer). Normally, the light-blocking layer 6 is formed using white ink to obtain a blocking effect of reflective light. It is necessary that in the printing in the gimmick light-transmission layer printing step and the light-blocking layer printing step, there is no overlap. An area ratio of the entire gimmick print layer 5 and the light-blocking layer 6 may be the same, i.e., 50% and 50%, but if the area ratio of the gimmick print layer 5 is greater, spoiler easily occurs. If the area ratio of the gimmick print layer 5 is small, the gimmick effect may not be sufficient. Therefore, an area ratio is appropriately selected. Since there is no overlap in the printing, the printing operations of the light-transmission layer printing step and the light-blocking layer printing step may be carried out by one-time printing step (printing pass) by the same ink-jet printing step. Since portions of two pictures (printing patterns) to be printed are different from each other, they can be made as perfectly fitted one data. According to this, they can be printed without deviation by one-time printing step. Materials (inks) to be discharged onto the reflection picture print layer 8 are cyan, magenta and yellow inks which are three primary colors of colors, the light transmitting gimmick print layer 5 is printed in translucent ink, and if the ink is appropriately selected and set in the ink-jet printer and the layer is formed, the producing step (printing pass) is simplified, and overlap of printing can also be prevented.

The layers of the gimmick print layer 5 and the light-blocking layer 6 are printed into the mesh-shapes using the ink-jet printing (not shown) while using the circular dot pattern having the diameter of about 1 to 1.2 mm as described above. However, if the diameter of the dot pattern is greater, the gimmick print layer 5 can visually be seen at the normal time, and the gimmick effect as the gimmick expression medium 100 is deteriorated and therefore, the appropriate diameter is 1 mm.

The protection layer 9 made of plastic is provided on the frontmost surface for protecting the ink-jet printing layers. The gimmick camouflage layer 10 having the predetermined thickness is formed only on the gimmick print layer 5 in black ink.

The printing operation for forming the light-blocking layer 6 by the light-blocking layer printing step is carried out using the white ink. To enhance the reflection light blocking effect and to show a picture and a character at the normal time, the reflection picture 7 which comes to a front surface is printed neatly (character is also appropriately printed) (this is because color of the picture is excellently developed). The reflection light blocking effect cannot be obtained by one-time printing operation by the ink-jet printing in some cases, and two to three times printing operations are required in some cases. In this case, the light-blocking layer may be formed using white ink in all of the printing steps of the light-blocking layer, but if yellow ink is mixed into the white ink, the reflection light blocking effect can be obtained even by one-time printing operation in some cases.

Next, the reflection picture 7 which comes to the frontmost surface to show a picture or a character on the light-blocking layer 6 at the normal time is printed (character is also printed appropriately) (picture printing step). Since the light-blocking layer 6 is printed in white ink, if deviation exists between printed portions of the reflection picture 7) (character is also printed appropriately), it is considered that white color of the light-blocking layer 6 is seen from behind the reflection picture 7 and the white color outstands. It is necessary, in some cases, to devise the print data (or program) of the reflection picture 7 such that color portions of the reflection picture 7 are largely printed (dot pattern is thickened to absorb white color of the deviated portion) to prevent the white ink from being seen so that the white color does not outstand.

As a further device to enhance the gimmick effect, after the gimmick light-transmission layer printing step, the gimmick camouflage layer 10 is printed (gimmick camouflage layer printing step) to mitigate (camouflage) a phenomenon that the pattern 4 of the gimmick print layer 5 is discriminated at normal time (in such a degree that the pattern 4 is faintly seen) (spoiler) (gimmick camouflage layer printing step). By appropriately selecting the printing thickness using black ink, it is possible to prevent the pattern of the gimmick print layer 5 from being easily seen at normal time. Light quantity (luminance) of the gimmick light-transmission layer for a viewer is reduced by the gimmick camouflage layer 10, but it is possible to relatively solve the problem by printing while previously increasing the luminance of color of the gimmick print layer 5. In the printing step of the gimmick camouflage layer 10, the reflection picture 7 for showing a picture or a character do not overlap the light-blocking layer 6 at normal time (character is also printed appropriately). Therefore, this operation can simultaneously be carried out in the step of forming a predetermined pattern in one-time printing step by the same ink-jet printing step.

In the gimmick light-transmission layer printing step and the light-blocking layer printing step, predetermined patterns may be formed in one-time printing step by the same ink-jet printing step, the producing step is simplified and overlap of printing can also be prevented.

Concrete Content for Carrying Out the Invention (Part 2)

Next, another embodiment of the invention will be described. FIG. 5(*a*) is a step explanatory diagram in the above-described embodiment, and FIG. 5(*b*) is a step explanatory diagram of another embodiment of the invention. The same configuration and steps as those in the previous embodiment will be omitted. In this embodiment, the gimmick light-transmission layer printing step and the picture printing step are carried out by a common printing step by the same ink-jet printer. If two pictures (printing patterns) are perfectly fitted as one data, they can be printed without deviation by one-time printing step. In the step of this other embodiment, the light-blocking layer 6 which partially blocks reflective light is first formed on the retroreflective medium 1 by the ink-jet printing (light-blocking layer printing step). The light-blocking layer 6 is formed using white ink for obtaining reflective light blocking effect. The light-blocking layer 6 is formed excluding on a printing pattern portion of the gimmick print layer 5 carried out by the gimmick light-transmission layer printing step which is a subsequent step and it is important that no overlap exists. In this embodiment, the light-blocking layer 6 is printed twice using white ink by the ink-jet printing, and the light-blocking layer 6 having a sufficient thickness is formed.

Next, the reflection picture 7 which comes to the frontmost surface for showing a picture or a character at the normal time is printed (character is also printed appropriately) on the light-blocking layer 6 formed in the light-blocking layer printing step (picture printing step). In this picture printing step, the printing step of the reflection picture 7 and the gimmick light-transmission layer printing step of the pattern 4 of the gimmick print layer 5 are carried out by one-time common ink-jet printing step using the same ink-jet printer. Since portions of the reflection picture 7 and the pattern 4 (printing pattern) of the gimmick print layer 5 to be printed are different from each other, they can be perfectly fitted as one data. If print data sets of the two designs are perfectly fitted as one data, they can be printed without deviation by one-time printing step (printing pass). Since the pattern of the reflection picture 7 is formed on a location other than the light-blocking layer 6, the pattern of the reflection picture 7 can be printed at the same time as the pattern of the light-blocking layer 6 by the same ink-jet printer. According to this, the producing step is simplified and printing overlap can also be prevented.

Concrete Content for Carrying Out the Invention (Part 3)

Next, another embodiment of the invention will be described. FIG. 6 shows a state in which an original picture of a reflection color pattern made by reflection color of a picture printing layer which expresses a usual (normal) showing manner in a gimmick expression medium according to another embodiment of the invention and a reflection color pattern having a stripe-shaped or dot-shaped lattice pattern from the original picture are formed. FIG. 7 shows a state in which an original picture of a light color pattern of a functional medium which is expressed at the time of flash photographing in the embodiment and a stripe-shaped or dot-shaped lattice pattern from the original picture are formed. Further, realization of a gimmick effect of the gimmick expression medium of the embodiment will be described using FIG. 8.

According to a gimmick expression medium 200 of the embodiment, a functional medium 201 which shines by its own light or reflects light if energy is given, and a picture printing layer 202 which shows reflection color of a picture or a character at the normal time are placed using a stripe-shaped lattice pattern 203S or a dot-shaped lattice pattern 203D. In FIG. 6, an original picture 204G of a reflection color pattern 204 by reflection color of the picture printing layer 202 which expresses a usual (normal) showing manner is first prepared, and the reflection color patterns 204S and 204D having stripe-shaped or dot-shaped lattice patterns from the original picture 204G are printed on the picture printing layer 202 by cyan, magenta and yellow inks which are three primary colors of colors. They (two pumpkins for example) are printed by an ink-jet printer (not shown) using the reflection color patterns 204S and 204D by reflection color. Offset printing may be employed. The reflection color patterns 204S and 204D are formed into mesh-shape without printing a hole of the circular dot-shaped lattice patterns 203D having a diameter of about 0.8 to 1.2 mm, or without printing the stripe-shaped lattice pattern 203S having a width of about 0.3 to 0.8 mm. A light color pattern 205 of the functional medium 201 is placed on the portion where the unprinted hole or a portion where the stripe-shaped lattice pattern is not printed. FIG. 6 shows the reflection color patterns 204S and 204D in the enlarged manner. Since the stripe-shaped lattice pattern 203S or the dot-shaped lattice pattern 203D is fine or minute, they look the same as the original picture 204G (two pumpkins) as a whole.

Further, in FIG. 7, in the light color pattern 205 of the functional medium 201 which is expressed at the time of flash photograph, an original picture 205G is first prepared. A light color pattern 205S or 205D of the functional medium 201 is formed from the original picture 205G using the stripe-shaped or dot-shaped lattice patterns 203S and 203D. In the light color pattern 205S or 205D, a design or a character is expressed by read, green and blue which are three primary colors of light. As described above, since the reflection color patterns 204S and 204D are formed into the unprinted mesh-shapes by the lattice patterns 203S and 203D, the light color pattern 205 (205S or 205D) of the functional medium 201 is placed on the unprinted portion such that the light color pattern is perfectly positioned on the unprinted portion. Since the reflection color pattern 204 has the portion which is not printed by the stripe-shaped lattice pattern 203S or the dot-shaped lattice pattern 203D as described above, the light color pattern 205S or 205D is placed on this unprinted portion. According to the printed state or placed state of the light color pattern 205 (Halloween ghost) which is expressed at the time of the flash photograph as shown in FIG. 7, in the enlarged portion in FIG. 7, the lattice pattern 203S or the dot-shaped lattice pattern 203D can be seen, but since the reflection color pattern 204S and 204D are placed in adjacent, in a normal environment (under solar light or illumination or the like) as shown in FIG. 8, since the light lattice pattern 203S (or dot-shaped lattice) is fine or minute, the pattern looks the same as the original picture 204G (two pumpkins) as shown in the left side in FIG. 8 as a whole, and the light color pattern 205S does not outstand as a whole.

As shown in FIG. 8, in a normal state (under natural light or electric light), the reflection color pattern 204S looks the same as the original picture 202 (two pumpkins for example) as the entire picture printing layer 202 (left side in FIG. 8). If energy is applied (flash emission or the like), the functional medium 201 (the above-described retroreflective medium is used in this embodiment) reacts, the light color pattern 205S (Halloween ghost) emits light or emerges by reflection light, and the light color pattern 205S (Halloween ghost) emerges and appears from behind the reflection color pattern 204S (two pumpkins) as shown in FIG. 8 (left side).

The reflection color pattern 204 (two pumpkins) and the light color pattern 205 of the functional medium 201 are printed by the offset printing on paper, cloth or plastic by the ink-jet printer (not shown) in this embodiment, but the reflection color pattern 204 (two pumpkins) may be printed on the functional medium 201 while avoiding or covering the light color pattern 205 of the functional medium 201. That is, the functional medium 201 is composed of the retroreflective medium. According to this, the structure of the above-described previous embodiment can be applied as it is. The picture printing layer 202 is placed on the functional medium 201, and expression made by the light color pattern 205 of the functional medium 201 is partially hidden. If the functional medium 201 is composed of a medium having any one of ultraviolet light-emitting body, phosphorescence body, solvatochromic fluorescent dye and stress luminous body, it is possible to obtain the gimmick effect capable of obtaining the same configuration as the above-described embodiment. If a direction of stripe of the stripe-shaped lattice pattern 203S is set parallel to a sending direction of paper or cloth which becomes a base of the medium at the printing time, an adjusting direction of deviation between the reflection color pattern 204S and the light color pattern 205S becomes only a width direction which is perpendicular to the sending direction. Therefore, this configuration is of advantage.

These lattice patterns 203D and 203S are formed into the mesh-shapes by the ink-jet printer (not shown), but to obtain a more normal visual effect, the gimmick camouflage layer 10 having a predetermined thickness may be formed on the light color pattern 205 by black ink. The gimmick camouflage layer 10 is for preventing the light color pattern 205 from being seen at the normal time, but when the gimmick camouflage layer 10 is provided, a printing thickness is appropriately selected using black ink or the like. When the functional medium 201 is configured by a retroreflective medium, attention should be paid to the fact that the functional medium 201 includes the black reflection layer 2 on its back surface as described in the previous embodiment. The black reflection layer 2 on the back surface may be configured by the printing, or the reflection layer 2 may be configured by providing adhesive for fixing the retroreflective element 3 formed from prism or glass bead with a black adhesive layer. The reflection layer 2 makes it difficult to see at the normal time, but since light quantity (luminance) of the gimmick print layer 5 for a viewer is reduced, it is necessary to correct to previously increase the luminance of color to print when the gimmick print layer 5 which becomes the light color pattern 205 is printed. According to this, it is possible to relatively solve the problem. It is important to appropriately select (cut and try) the printing thickness of the gimmick camouflage layer 10 using black ink or the like.

An entire area ratio of the reflection color pattern 204 and the light color pattern 205 of the functional medium 201 may be the same, i.e., 50% and 50%, but if the area ratio of the gimmick print layer 5 is greater, spoiler easily occurs. It is preferable that there is no gap between the reflection color pattern 204 and the light color pattern 205 of the functional medium 201, but there may be a printing margin (filled with color ink) of about 0.1 to 0.15 mm, and the light color pattern 205 of the functional medium 201 may be made smaller. The reflection color pattern 204 and the light color pattern 205 of the functional medium 201 may be formed by one-time printing step (printing pass) by the same ink-jet printing step. If the two pictures (printing pattern) are perfectly fitted into one data, it is possible to print without deviation by one-time printing step. If material (ink) to be discharged is appropriately selected to set the material in the ink-jet printer, the producing step (printing pass) is simplified and printing overlap can be avoided.

Concrete Content for Carrying Out the Invention (Part 4)

FIG. 9 is an exploded view of a gimmick expression medium obtained though steps of a producing method of the gimmick expression medium according to a fourth embodiment of the invention, and FIG. 10 is a partially enlarged sectional view of the gimmick expression medium in the embodiment. The same reference numbers are allocated to the same configurations as parts of the above-described embodiment, and description thereof will be omitted. According to a basic configuration of the gimmick expression medium which can be obtained by this producing method, as expression for an observer, reflection picture print which is seen under normal illumination is shown to a gimmick medium (printed matter) and next, expression which is different from the reflection picture print is emerged by previously prepared and printed gimmick print for carrying out expression made by light which is directly emitted to eyes of the observer, thereby carrying out the gimmick expression.

A gimmick expression medium 300 to be produced in the embodiment includes the black reflection layer 2 on its back surface, and includes the retroreflective medium 1 provided therein with the retroreflective element 3. A printing medium 301 placed on the retroreflective medium 1 is composed of a light-transmission layer 302, and transparent printing material (plastic film or the like) is used as the light-transmission layer 302. Gimmick prints 303 for varying color of reflective light of the retroreflective medium 1 to produce the gimmick effect is printed on the light-transmission layer 302. The printing medium 301 is provided with light-blocking layers 304 for partially blocking reflective light which is reflected by the retroreflective medium 1. The light-blocking layers 304 are composed of white printing layers. Reflection picture prints 305 are printed on the light-blocking layers 304 to make it difficult for an observer to see the gimmick prints 303 and to make it possible to see the light-blocking layers 304 under normal illumination for producing the gimmick effect. The reflection picture print 305 and the gimmick prints 303 are placed in adjacent to each other using a stripe-shaped (or dot-shaped) lattice pattern 306.

A producing method of the above-described gimmick expression medium 300 will be described below. FIG. 11 are plan explanatory diagrams of the gimmick expression medium in producing steps of the embodiment, FIG. 12 is a plan view of the gimmick expression medium after the steps in the embodiment, FIG. 13 is a partially enlarged explanatory diagram for explaining a relation when the light-blocking layer and the reflection picture print 3 in the embodiment are formed (printed), and FIG. 14 is a partially enlarged plan view of a gimmick expression medium in another embodiment. First, printing media 301 having light-transmission layers 302 are placed in printing positions (e.g., ink-jet printer (not shown)) (setting step of printing media 301). FIG. 11(a) shows the printing medium 301. A background of the printing medium 301 is black, or a transparent medium (transparent plastic sheet) or the like which is colored to black (including color close to black but the color is not limited) is used, this is made as a layer which black-reflects under reflection light, and the gimmick print 303 is rendered inconspicuous under the reflection light to prevent the spoiler.

Next, the light-blocking layers 304 which partially cover the light-transmission layer 302 of the printing medium 301 to block the passing light are formed (printed) on the printing medium 301 (forming step of light-blocking layer). As shown in FIG. 11(b), the light-blocking layers 304 are composed of white printing layers. Nest, the reflection picture prints 305 (e.g., "pumpkins" are printed (see FIG. 11(c)) using ink which absorbs a portion of natural light on the light-blocking layers 304 to emerge reflection color (reflection picture print step).

At the same time, the gimmick prints 303 for varying color of light which passes though the light-transmission layer 302 to produce the gimmick effect are formed (printed) on the printing media 301 (gimmick print step) as shown in FIG. 11(d). The gimmick prints 303 and the reflection picture prints 305 are placed in adjacent to each other using the stripe-shaped or dot-shaped lattice patterns 306, and the reflection picture print step of forming the reflection picture prints 305 and the gimmick print step of printing the gimmick prints 303 are carried out by one step (one-pass) using the same printer. Since the gimmick prints 303 and the reflection picture prints 305 do not overlap each other, this step is carried out by one step (one-pass) using common image data. As shown in FIG. 12, according to the gimmick expression medium 300, the gimmick prints 303 and the reflection picture prints 305 are printed in adjacent to each other using the stripe-shaped or dot-shaped lattice patterns 306. Printing print data of the printer is printed using one sheet of printing data as shown in FIG. 12.

According to the gimmick expression medium 300 obtained in this manner, the reflection picture prints 305 ("pumpkins" or the like) are seen under natural light, and the gimmick prints 303 (eyes, mouth or the like) are seen under flash light such as a smartphone and thus, expression becomes gimmick expression.

The light-blocking layers 304 and the reflection picture prints 305 are formed (printed) using the stripe-shaped (or dot-shaped) lattice patterns 306, a width w1 of the light-blocking layer 304 is narrower than a width w2 of the reflection picture print 305, and they are printed and configured on the printing mediums 301 (see FIG. 13). This is for preventing the gimmick prints 303 from projecting from a lateral side of the reflection picture print 305 from being seen under the normal illumination, and this is a device for making it difficult to easily see the gimmick print 303.

In the above-described printing steps, a stripe lattice (or using circular dot pattern) having a width from 0.8 mm (preferably 1 mm) to 1.5 mm (preferably 1.2 mm) are printed and formed by the ink-jet printer (not shown). The gimmick expression medium 300 is appropriately provided at its frontmost surface with a protection layer such as plastic for protecting printing by ink jets. The gimmick camouflage layer 10 having a predetermined thickness may appropriately be printed (formed) on each of the gimmick prints 303 by black ink. The gimmick camouflage layer 10 is for preventing the pattern of the gimmick print 303 from being seen at the normal time. When the gimmick camouflage layer 10 is provided, a print thickness is appropriately selected using black ink. The gimmick camouflage layer 10 makes it difficult to see the pattern of the gimmick print layer 5 at the normal time, but since light quantity (luminance) of the gimmick print layer 5 for a viewer is reduced, it is necessary to correct to previously increase the luminance (brightness) of color to print when the gimmick print 303 is printed.

As a device for preventing the spoiler, it is preferable that the light-transmission layer 302 of the printing medium 301 is made as a layer which black-reflects under reflection light and therefore, it is preferable that color of the light-transmission layer 302 is set to black, gray or brown. As shown in FIG. 14, it is preferable that a spoiler-preventing zone which black-reflects under reflection light is formed between the reflection picture 7 and the gimmick print 303 (step of forming spoiler-preventing zone). If the light-transmission layer 302 is formed in black color, it is seen black under natural light by providing an unprinted portion on the light-transmission layer 302, and this becomes the spoiler-preventing zone. In FIG. 14, the gimmick print 303 is not shown and this portion is expressed in white color so that it can easily be seen, but if there is no gimmick print 303, the light-transmission layer 302 is seen black.

According to the gimmick expression medium 300 of the embodiment, flash light or light of smartphone is reflected to obtain light using the retroreflective medium 1 which includes the retroreflective element 3 therein. However, in the gimmick medium (printed matter), it is only necessary that the retroreflective element 3 reflects light basically such that it reacts at the time of flash photographing. Therefore, it is also possible to use ultraviolet light-emitting body, phosphorescence body, solvatochromic fluorescent dye or stress luminous body instead of the retroreflective element 3. It is also possible to receive natural solar light directly from a back surface to obtain light instead of reflection light. In this case also, the light-blocking layer 304 for blocking light which is emitted directly to eyes of an observer is provided, and the reflection picture print 305 is provided thereon to hide the gimmick print 303.

Instead of utilizing color variation of light by retroreflection, a printing medium 301 for the gimmick print 303 is subjected to a printing operation directly by luminous ink, and the gimmick print 303 may be carried out utilizing light emission by the luminous ink. In this case also, the light-blocking layer 304 for blocking light which is emitted directly to eyes of an observer is provided, and the reflection picture print 305 is provided to high the gimmick print 303 by the reflection picture print 305. In this case, an element including ultraviolet light-emitting body, phosphorescence body, solvatochromic fluorescent dye or stress luminous body is used as the luminous ink.

In the producing method of gimmick expression medium or in the data processing method for printing the gimmick expression medium, print data for the reflection picture print 305 and the gimmick print data for the gimmick print 303 are placed such that they do not basically overlap each other. Therefore, a higher gimmick effect can be obtained. When two printings, i.e., the reflection picture print 305 which is indispensable as foundation of the gimmick effect and the gimmick print 303 which is produced using light when the gimmick effect is required are carried out, they can be printed by one-pass. As compared with two-times printing, overlap or deviation of two printings does not occur by deviation caused by the printer and the printing medium, a design having a higher freedom degree can be printed neatly, and gimmick efficiency is enhanced.

As expression for an observer for producing gimmick, a basic configuration of the gimmick expression medium includes the reflection picture print 305 which is seen on the gimmick medium (printed matter) under normal illumination, and the gimmick print 303 using light which passes from the light-transmission layer of the printing medium 301 for carrying out expression made by light which is emitted directly to eyes of the observer or using light made by luminous ink printed on the printing medium 301. In the printing which is seen under normal illumination on a printed matter, the light-blocking layer 304 for blocking light which is emitted directly to eyes of an observer is provided, the gimmick print 303 is hidden, the reflection picture is formed on the light-blocking layer 304, and this is made as the reflection picture print 305. The print data for the reflection picture print 305 and the gimmick print data for the gimmick print 303 are placed in adjacent to each other using the stripe-shaped or dot-shaped lattice pattern.

In the producing method of the gimmick expression medium or the data processing method for printing the gimmick expression medium, the print data for the reflection picture print 305 and the gimmick print data for the gimmick print 303 are placed such that they do not overlap each other. Therefore, a higher gimmick effect can be obtained. When two printings, i.e., the reflection picture print 305 and the gimmick print 303 are carried out, they can be printed by one-pass. Therefore, as compared with the two-times printing, overlap or deviation of two printings does not occur by deviation caused by the printer and the printing medium, a design having a higher freedom degree can be printed neatly, and gimmick efficiency is enhanced.

The present invention includes the following configurations.

The gimmick expression medium 100 in the gimmick expression medium producing method includes a retroreflective medium provided at its back surface with a reflection layer and a retroreflective element, a light transmitting gimmick print layer placed on the retroreflective medium and having a predetermined pattern for varying color of reflection light of the retroreflective medium to produce a gimmick effect, a light-blocking layer for partially blocking reflective light of the retroreflective medium and a front surface printing layer printed on the light-blocking layer to show a reflection picture or a character at the normal time.

The gimmick expression medium 100 can be realized by ink-jet printing or offset printing. In the ink-jet printing, the gimmick expression medium 100 can be formed without overlapping fine patterns. Therefore, a predetermined pattern can advantageously be formed without overlapping the gimmick print layer and the light-blocking layer, and it is possible to save on ink costs. In the case of the offset printing, if paper is devised, it is possible to precisely apply color, and a large amount of gimmick expression media can efficiently be obtained.

To print a predetermined amount of black ink on the gimmick print layer, and to mitigate discrimination of a pattern of the gimmick print layer at the normal time, the gimmick print layer may further be provided with a gimmick camouflage layer thereon. By appropriately selecting a printing thickness using this black ink, it is possible to make it difficult to see the pattern of the gimmick print layer at the normal time. Although light quantity (luminance) of the gimmick print layer for a viewer is reduced, if printing is carried out while previously increasing luminance of color of the gimmick print layer, it is possible to relatively solve the problem.

The present invention further provides a gimmick expression medium producing method which achieves the above-described object. The producing method includes a gimmick print step of forming a light transmission gimmick print layer having a predetermined pattern for varying color of reflective light of retroreflective medium to produce a gimmick effect on the retroreflective medium which is provided at its back surface with a black reflection layer and with a retroreflective element, a light-blocking layer printing step of forming a light-blocking layer for partially blocking reflective light of the retroreflective medium, and a reflection picture print step of carrying out front surface reflection picture print to show a reflection picture or a character on the light-blocking layer at the normal time.

The present invention may further includes, after the gimmick print step, a gimmick camouflage layer printing step of mitigating discrimination of a pattern of the gimmick print layer at the normal time. According to the invention, the gimmick print step and the light-blocking layer printing step may be carried out in a step which forms a predetermined pattern in one-time printing step by the same ink-jet printing step. This simplifies a producing step, and prevents printing overlap. The gimmick print step and the printing step of the reflection picture or the character may be carried out in one-time printing step by the same ink-jet printer. This simplifies a producing step, and prevents printing overlap.

The present invention further provides a gimmick expression medium for achieving the above-described object. According to the gimmick expression medium, a functional medium which shines by its own light or which reflects light if energy is applied and a reflection picture print layer which shows reflection color of reflection picture or character at the normal time are placed using a stripe-shaped or dot-shaped lattice pattern, the functional medium includes a predetermined light color pattern for varying color of light which shines by its own light or which reflects to produce the gimmick effect, the reflection picture print layer which shows reflection picture or character at the normal time includes a reflection color pattern by reflection color, expression is varied by expression made by the reflection color pattern and expression made by the light color pattern which shines by its own light when energy is applied.

According to the invention, the functional medium is provided at its front surface with a black layer, or at the same time, the functional medium is provided at its front surface with a black light-transmission layer, and the gimmick camouflage layer of the light color pattern may be configured. In the invention, the functional medium can be configured by a retroreflective medium, or the functional medium may be composed of any one of medium of ultraviolet light-emitting body, phosphorescence body, solvatochromic fluorescent dye and stress luminous body. Further, in the invention, the reflection picture print layer can be placed on the functional medium, expression made by the light color pattern of the functional medium can partially be hidden, and the reflection color pattern of the reflection picture print layer can be printed on a predetermined pattern by ink-jet printing or offset printing.

In the invention, the functional medium which shines by its own light or which reflects light if energy is applied, and the reflection picture print layer which shows reflection color of the reflection picture or character at the normal time are placed using the stripe-shaped or dot-shaped lattice pattern, the functional medium includes the predetermined light color pattern for varying color of light which shines by its own light or which reflects light to produce the gimmick effect, and the reflection picture print layer for showing the reflection picture or character at the normal time includes the reflection color pattern by the reflection color, and expression is varied by expression made by the reflection color pattern and expression made by the light color pattern which shines by its own light when energy is applied. If energy is applied at the time of flash photographing using a smartphone, expression which is different from the reflection picture or character at the normal time can be realized, and the invention exerts an effect capable of providing a medium which effectively carry out dramatic impact or presentation.

The present invention dexterously utilizes a difference between three primary colors of colors and a recurrence method of three primary colors, and light is expressed by RGB and if three colors are combined, it looks white light, the three primary colors of colors are expressed by CMY and if the three colors are combined, it becomes black reflection color. In a normal state (when flash light or the like is not shed), the retroreflective medium on the black back surface looks black. When the flash light or the like is shed on the other hand, since it comes back with three primary colors of light, the light comes back in white (basically, black light does not exist). When flash light or the like is shed, reflection light from the retroreflective medium is white, and the light is colored though the light transmitting gimmick print layer. In the retroreflective medium, even if black is selected as the back surface thereof, the black does not outstand, but when the flash light or the like is shed and light reflects and comes back, the light passes though the color layer and the light is seen under that color. Therefore, the gimmick effect can be obtained. Even if the gimmick camouflage layer is added, since this layer is black, the layer does not easily outstand and therefore, the printing step of the gimmick camouflage layer may further be included.

INDUSTRIAL APPLICABILITY

The present invention can provide a medium which emerges expression which is different from a reflection picture or character at the normal time when flash photographing is carried out by a smartphone or the like and which effectively carry out dramatic impact or presentation, and the invention can be used for a display, display window and the like.

EXPLANATION OF SYMBOLS 1 retroreflective medium
2 reflection layer
3 retroreflective element
4 predetermined pattern for producing gimmick effect
5 gimmick print layer
6 light-blocking layer
7 reflection picture
8 reflection picture print layer on frontmost surface
9 protection layer
10 gimmick camouflage layer
100, 300 gimmick expression medium
301 printing medium
302 light-transmission layer
303 gimmick print
304 light-blocking layer
305 reflection picture print
306 lattice pattern

The invention claimed is:

1. A gimmick expression medium producing method for forming a printing layer which produces a gimmick effect for a printing medium using the printing medium having a light-transmission layer,
the method comprising:
a light-blocking layer forming step of partially covering the light-transmission layer of the printing medium to form a light-blocking layer for blocking light on the printing medium;
a reflection picture print step of forming a reflection picture on the light-blocking layer; and
a gimmick print step of forming a gimmick print layer to vary color of light which passes though the light-transmission layer to produce the gimmick effect, wherein
in the light-blocking layer forming step, the light-blocking layer is placed on the printing medium to cover the light-transmission layer of the printing medium using a stripe-shaped or dot-shaped lattice pattern,
the reflection picture and the gimmick print layer are placed in adjacent to each other by the stripe-shaped or dot-shaped lattice pattern without overlapping, and the reflection picture print step of forming the reflection picture and the gimmick print step are carried out by one step (one-pass) using common image data using a same printer.

2. The gimmick expression medium producing method according to claim 1, wherein the light-transmission layer of the printing medium is a layer which black-reflects under reflection light.

3. The gimmick expression medium producing method according to claim 1, further comprising a step of forming, between the reflection picture and the gimmick print layer, a spoiler-preventing zone which black-reflects under reflection light.

4. The gimmick expression medium producing method according to claim 1, wherein the light which passes though the light-transmission layer is obtained by any one of ultraviolet light-emitting body, phosphorescence body, solvatochromic fluorescent dye, stress luminous body, retroreflective medium and natural solar light.

5. A gimmick expression medium producing method for printing a printing layer which produces a gimmick effect for a printing medium,
the method comprising:
a gimmick print step of forming, on the printing medium using luminous ink, a gimmick print layer which produces the gimmick effect;
a light-blocking layer forming step of forming, on the printing medium, a light-blocking layer which partially covers the printing medium; and
a reflection picture print step of forming a reflection picture on the light-blocking layer, wherein in the light-blocking layer forming step, the light-blocking layer is placed on the printing medium to cover a portion of the printing medium using a stripe-shaped or dot-shaped lattice pattern, the reflection picture and the gimmick print layer are placed in adjacent to each other by the stripe-shaped or dot-shaped lattice pattern without overlapping, and the reflection picture print step of forming the reflection picture and the gimmick print step are carried out by one step (one-pass) using common image data using a same printer.

6. The gimmick expression medium producing method according to claim 5, wherein the light-transmission layer of the printing medium is a layer which black-reflects under reflection light.

7. The gimmick expression medium producing method according to claim 5, further comprising a step of forming, between the reflection picture and the gimmick print layer, a spoiler-preventing zone which black-reflects under reflection light.

8. The gimmick expression medium producing method according to claim 5, wherein the luminous ink includes any one of ultraviolet light-emitting body, phosphorescence body, solvatochromic fluorescent dye and stress luminous body.

9. A data processing method for printing a gimmick expression medium to print a printing layer which produces a gimmick effect for a printing medium, wherein when print data for reflection picture print to form a reflection picture on a light-blocking layer which partially covers the printing medium, and gimmick print data for gimmick print to produce the gimmick effect are formed, the print data for the reflection picture print and the gimmick print data for the gimmick print are combined in adjacent to each other into one common image data using a stripe-shaped or dot-shaped lattice pattern to form print data, and the reflection picture print and the gimmick print are carried out by one step (one-pass) using a same printer.

10. The data processing method for the gimmick expression medium according to claim 9, wherein print data is formed, and in the print data, a spoiler-preventing zone which black-reflects under reflection light is provided between the reflection picture and the gimmick print.

11. The data processing method for the gimmick expression medium according to claim 9, wherein a gimmick print step and a reflection picture print step are print data for a same ink-jet printing step.

* * * * *